United States Patent
Nadimpalli et al.

(10) Patent No.: US 11,593,973 B2
(45) Date of Patent: Feb. 28, 2023

(54) METHOD AND SYSTEM FOR AUGMENTED REALITY (AR) CONTENT CREATION

(71) Applicant: Wipro Limited, Bangalore (IN)

(72) Inventors: Vivek Kumar Varma Nadimpalli, Hyderabad (IN); Gopichand Agnihotram, Bangalore (IN)

(73) Assignee: Wipro Limited, Bangalore (IN)

( * ) Notice: Subject to any disclaimer, the term of this patent is extended or adjusted under 35 U.S.C. 154(b) by 321 days.

(21) Appl. No.: 17/120,658

(22) Filed: Dec. 14, 2020

(65) Prior Publication Data

US 2022/0138996 A1 May 5, 2022

(30) Foreign Application Priority Data

Oct. 29, 2020 (IN) .............................. 202041047273

(51) Int. Cl.
*G06T 11/00* (2006.01)
*G06F 16/23* (2019.01)
*G06N 20/00* (2019.01)
*G06N 5/04* (2006.01)
*G06V 20/40* (2022.01)

(52) U.S. Cl.
CPC .......... *G06T 11/00* (2013.01); *G06F 16/2379* (2019.01); *G06N 5/04* (2013.01); *G06N 20/00* (2019.01); *G06V 20/41* (2022.01); *G06V 20/47* (2022.01); *G06V 20/49* (2022.01); *G06V 20/44* (2022.01)

(58) Field of Classification Search
CPC ....... G06T 11/00; G06F 16/2379; G06N 5/04; G06N 20/00; G06N 3/0454; G06N 3/0445; G06N 3/08; G06V 20/41; G06V 20/47; G06V 20/49; G06V 20/44; G06V 10/82; G06V 20/20
See application file for complete search history.

(56) References Cited

U.S. PATENT DOCUMENTS

2016/0247324 A1 8/2016 Mullins et al.
2020/0026257 A1* 1/2020 Dalal .................... G06V 20/41
2021/0103770 A1* 4/2021 van Baar ............... G06V 40/10

* cited by examiner

*Primary Examiner* — Jacinta M Crawford
*Assistant Examiner* — Andrew Shin
(74) *Attorney, Agent, or Firm* — Finnegan, Henderson, Farabow, Garrett & Dunner LLP

(57) ABSTRACT

A method and a system for Augmented Reality (AR) content creation is disclosed. The method includes creating a feature vector corresponding to each of a sequence of frames extracted from a video, based on a plurality of features captured. The method further includes determining a vector distance between each of two consecutive frames from the sequence of frames, based on the feature vector associated with each of the two consecutive frames. The method further includes dividing the video into a plurality of frames based on the determined vector distance. The method further includes creating a storyline based on an object and an action associated with the object in each of the plurality of frames, and generating a set of instructions for a user based on the storyline created for each of the plurality of frames and real-time video stream capturing a current state of a user environment.

17 Claims, 10 Drawing Sheets

METHOD AND SYSTEM FOR AUGMENTED REALITY (AR) CONTENT CREATION

TECHNICAL FIELD

This disclosure relates generally to Augmented Reality (AR), and more particularly relates to a method and a system for AR content creation.

BACKGROUND

In current technological world, Augmented Reality (AR) has increasingly become a useful platform for developing systems and devices that may be used to assist users in various industries. Thereby, AR devices are programmed with a set of instructions for guiding users to perform one or more tasks to repair and maintain machines or devices. In many cases, the users may not have prior knowledge of performing these tasks.

In certain scenarios, the existing systems may include initially capturing a video of an expert performing repairing and maintenance tasks. The video may then be manually divided for procedure where every instruction for each step may be written manually. Thereafter, the written instructions may be programmed in the AR device. Such existing systems may thus require tedious process for manual creation of instructions for programming the AR device.

Additionally, the existing systems may create virtual figures and may then map each instruction to an associated action in the virtual figures. For example, a system is developed to help users to repair a mobile phone. In order to develop such a system, all steps required to repair the mobile phone need to be manually created by a developer, which is very tedious task. Moreover, in order to manually create the steps, the developer may need to extract various steps from video to generate instructions for repairing the mobile phone. Thereafter, the developer may need to map each instruction with an action performed to repair the mobile phone, which will be a long process when done manually.

Accordingly, there is a need for a method and system that is robust and efficient for automatic AR content creation. Further, there is a need for a system that saves times and effort for creation of the AR content.

SUMMARY

In an embodiment, a method for Augmented Reality (AR) content creation is disclosed. In one embodiment, the method may include creating a feature vector corresponding to each of a sequence of frames extracted from a video, based on a plurality of features captured for each of the sequence of frames. The creation of the feature vector may be based on a first pre-trained machine learning model. The method may further include determining a vector distance between each of two consecutive frames from the sequence of frames, based on the feature vector associated with each of the two consecutive frames. The method may further include dividing the video into a plurality of frames based on the determined vector distance. The video may be divided each time the determined vector distance between two consecutive frames is greater than a first predefined threshold value. The method may further include creating a storyline based on an object and an action associated with the object in each of the plurality of frames. The object and the action associated with the object may be identified based on a second pre-trained machine learning model. The method may further include generating a set of instructions for a user based on the storyline created for each of the plurality of frames and real-time video stream capturing a current state of a user environment. The set of instructions may be generated by a third pre-trained machine learning model.

In another embodiment, a system for AR content creation is disclosed. The system includes a processor and a memory communicatively coupled to the processor, wherein the memory stores processor instructions, which, on execution, causes the processor to create a feature vector corresponding to each of a sequence of frames extracted from a video, based on a plurality of features captured for each of the sequence of frames. The creation of the feature vector may be based on a first pre-trained machine learning model. The processor instructions further cause the processor to determine a vector distance between each of two consecutive frames from the sequence of frames, based on the feature vector associated with each of the two consecutive frames. The processor instructions further cause the processor to divide the video into a plurality of frames based on the determined vector distance. The video may be divided each time the determined vector distance between two consecutive frames is greater than a first predefined threshold value. The processor instructions further cause the processor to create a storyline based on an object and an action associated with the object in each of the plurality of frames. The object and the action associated with the object may be identified based on a second pre-trained machine learning model. The processor instructions further cause the processor to generate a set of instructions for a user based on the storyline created for each of the plurality of frames and real-time video stream capturing a current state of a user environment. The set of instructions may be generated by a third pre-trained machine learning model.

In yet another embodiment, a non-transitory computer-readable storage medium is disclosed. The non-transitory computer-readable storage medium has instructions stored thereon, a set of computer-executable instructions causing a computer comprising one or more processors to perform steps comprising creating a feature vector corresponding to each of a sequence of frames extracted from a video, based on a plurality of features captured for each of the sequence of frames. The creation of the feature vector may be based on a first pre-trained machine learning model. The operations may further include determining a vector distance between each of two consecutive frames from the sequence of frames, based on the feature vector associated with each of the two consecutive frames. The operations may further include dividing the video into a plurality of frames based on the determined vector distance. The video may be divided each time the determined vector distance between two consecutive frames is greater than a first predefined threshold value. The operations may further include creating a storyline based on an object and an action associated with the object in each of the plurality of frames. The object and the action associated with the object may be identified based on a second pre-trained machine learning model. The operations may further include generating a set of instructions for a user based on the storyline created for each of the plurality of frames and real-time video stream capturing a current state of a user environment. The set of instructions may be generated by a third pre-trained machine learning model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
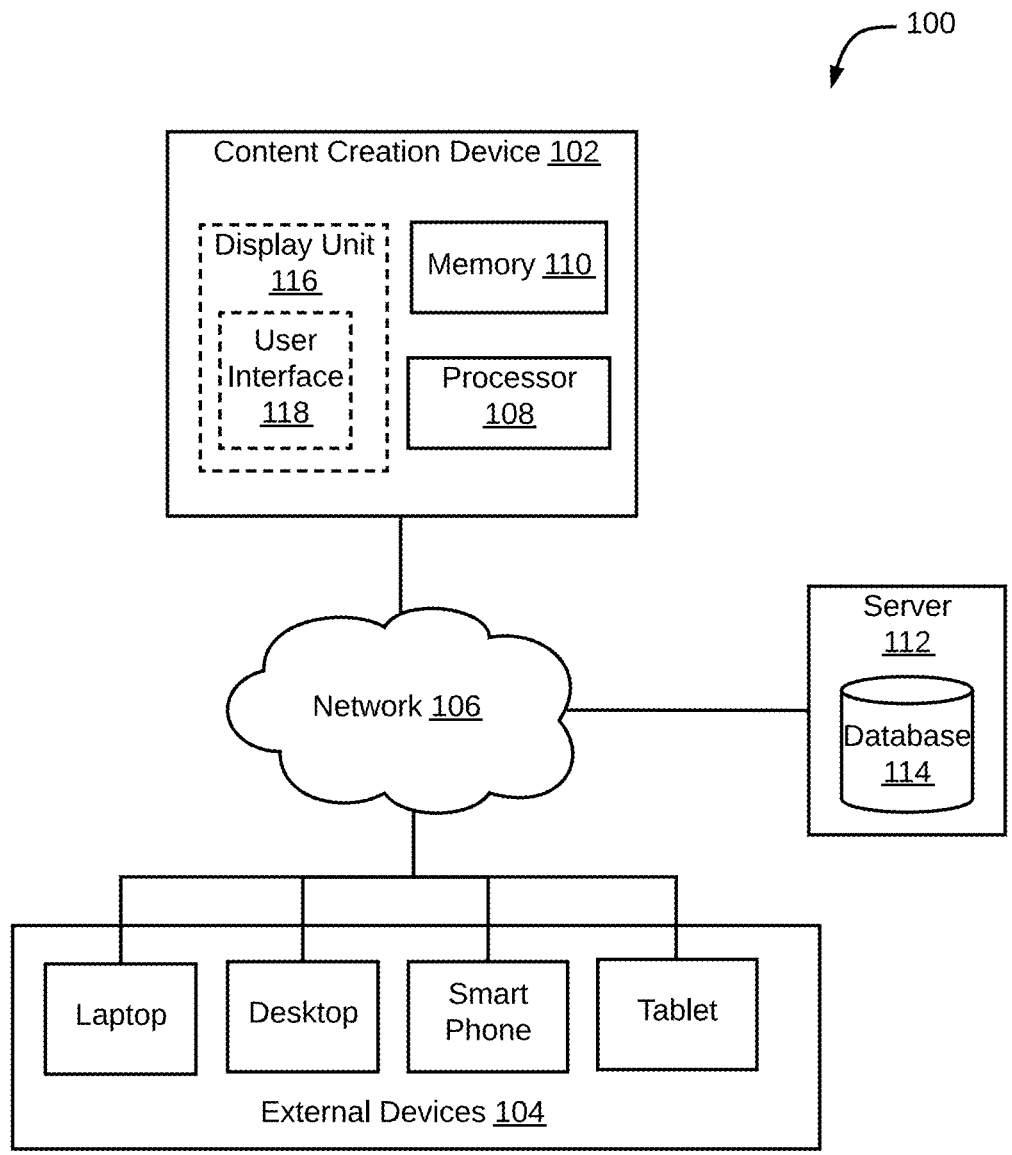
FIG. 1 illustrates a block diagram of a content creation device deployed in a network environment, in accordance with an embodiment.

In one embodiment, a network environment 100 for deploying a content creation device for Augmented Reality (AR) content creation is illustrated in FIG. 1. With reference to FIG. 1, there is shown a content creation device 102, external devices 104, a network 106, and a server 112. The external devices 104 may include, but are not limited to, a laptop, a desktop, a smartphone, and a tablet (not labelled in FIG. 1). In an embodiment, the external devices 104 may also include an AR device. The external devices 104 may be communicatively coupled to the content creation device 102, via the network 106. The network 106 may be a wired or a wireless network. The examples of the network 106 may include, but are not limited to, the Internet, Wireless Local Area Network (WLAN), Wi-Fi, Long Term Evolution (LTE), Worldwide Interoperability for Microwave Access (WiMAX), and General Packet Radio Service (GPRS). The content creation device 102 may further include a processor 108, a memory 110, a display unit 116, and a user interface 118. Additionally, the server 112 may include a database 114.

The content creation device 102 may have the processing capabilities to automatically create content for AR devices. Examples of the content creation device 102 may include, but are not limited to, a server, a desktop, a laptop, a notebook, a netbook, a tablet, a smartphone, and a mobile phone. In an embodiment, the content creation device 102 may itself be an AR device. In order to create the content for the AR device, the content creation device 102 may be configured to generate a set of instructions for a user that may be overlaid in real-time as AR content to assist the user for performing a task. For example, the task may correspond to repair and maintenance of a device or a machine. The content creation device 102 may generate the set of instructions based on a storyline that is created for each of a plurality of frames generated from an earlier recorded video and a real-time video that captures a current state of a user environment.

The content creation device 102 may be configured to create a sequence of frames from the earlier recorded video. The earlier recorded video may be extracted from the server 112 via the network 106. In an embodiment, the database 114 of the server 112 may be periodically updated with a new set of videos that are associated with repair and maintenance work performed for various devices or machines. Once the sequence of frames is created, the content creation device 102 may be configured to capture a plurality of features for each of the sequence of frames. The content creation device 102 may create a feature vector corresponding to each of the sequence of frames extracted from the video based on the plurality of features. The plurality of frames may then be generated based on vector distance between each of two consecutive frames from the sequence of frames. This is further explained in detail in conjunction with FIG. 2-FIG. 7.

The content creation device 102 may further be configured to receive an input, such as, the real-time video that captures the current state of the user environment. The earlier recorded video and the real-time video may be received by the content creation device 102 from one of the external devices 104. In an embodiment, the real-time video may be captured by the content creation device 102 (when the content creation device 102 itself is an AR device).

As will be described in greater detail in conjunction with FIG. 2 to FIG. 9, in order to automatically create the content for the AR device, the content creation device 102 may include a processor 108 which may be communicatively coupled to a memory 110. The memory 110 may store processor instructions, which when executed by the processor 108 may cause the processor 108 to create the content for the AR device. This is further explained in detail in conjunction with FIG. 2. The memory 110 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random-Access Memory (DRAM), and Static Random-Access memory (SRAM).

The content creation device 102 may include a display unit 116. The display unit 116 may further include a user interface 118. A user or a developer may interact with the content creation device 102 and vice versa through the display unit 116. The display unit 116 may be configured to display an intermediate result (e.g., a vector distance between two consecutive frames). The display unit 116 may be further configured to display a final result (for example, the set of instructions) for the content creation device 102. The user interface 118 may be configured to receive input on intermediate results (for example, the storyline or the set of instructions created) to the content creation device 102.

Figure 2:
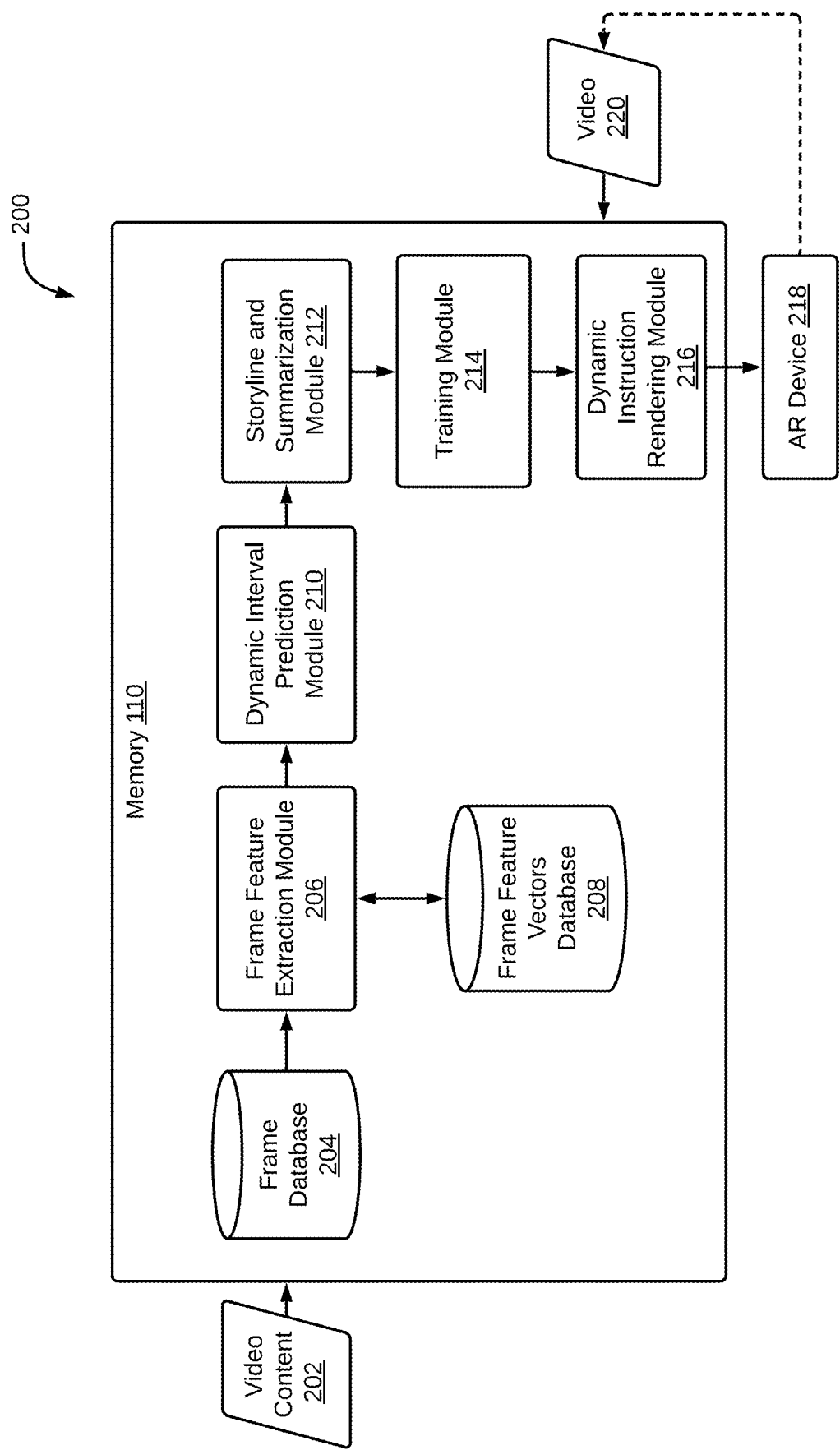
FIG. 2 illustrates a functional block diagram of various modules within a memory of a content creation device, in accordance with an embodiment.

Referring now to FIG. 2, a functional block diagram 200 of various modules within the memory 110 of the content creation device 102 is illustrated, in accordance with an embodiment. With reference to FIG. 2, there is shown video content 202, a frame database 204, a frame feature extraction module 206, a dynamic interval prediction module 210, a storyline and summarization module 212, a training module 214, a dynamic instruction rendering module 216, an AR device 218, and a video 220. FIG. 2 is explained in conjunction with FIG. 1. While the video content 202 may include videos that are already recorded at an earlier instant of time, the video 220 may be a real-time video that may capture a current state of a user environment. The video 220 may be captured by the AR device 218.

The content creation device 102 may be configured to automatically create content for the AR device 218 by generating a set of instructions to be viewed by the user via the AR device 218 as AR content overlaid over the video 220. The content creation device 102 may be configured to generate the set of instructions based on a storyline created for each of a plurality of frames and the video 220. The memory 110 may be configured to store the video content 202 (for example, in the frame database 204 as frames) and may include modules (i.e., modules 206, 210-216) that may perform various functions so as to create the AR content. As will be appreciated by those skilled in the art, all such aforementioned modules 204-216 may be represented as a single module or a combination of different modules. Moreover, as will be appreciated by those skilled in the art, each of the modules 204-216 may reside, in whole or in parts, on one device or multiple devices in communication with each other.

In an embodiment, the video content 202 may correspond to video of an expert performing repair task or maintenance task for a particular device or a machine. It may be apparent to a person skilled in the art that the video content 202 may include multiple videos that may be associated with different devices or machines. The video content 202 may be received and divided into a sequence of frames based on a fixed time-interval. With reference to FIG. 1, the video content 202 may be received by the content creation device 102. By way of an example, the sequence of frames may correspond to a set of images. Each of the sequence of frames created by dividing the video content 202 may be stored in the frame database 204. The sequence of frames stored in the frame database 204 may be used to generate the set of instructions for user reference while repairing that particular device or machine.

The frame feature extraction module 206 may be configured to extract each of the sequence of frames from the frame database 204. Once each of the sequence of frames are extracted, the frame feature extraction module 206 may be configured to extract a plurality of features from each of the sequence of frames. In an embodiment, the frame feature extraction module 206 may extract the plurality of features based on a first pre-trained machine learning model. As will be appreciated, the first pre-trained machine learning model may correspond to any deep neural network model (for example, a Convolution Neural Network (CNN) model). Once the plurality of feature vectors are extracted, the frame feature extraction module 206 may be configured to create a feature vector corresponding to each of the sequence of frames. The frame feature extraction module 206 may be configured to create the feature vector based on the plurality of features captured for each of the sequence of frames. Moreover, the feature vector may be created based on the first pre-trained machine learning model.

The feature vectors created for each of the sequence of frames may be stored in the frame feature vectors database 208 for further computation. It may be noted that the process of storing the feature vectors in the frame feature vectors database 208 may continue, until the feature vector corresponding to each of the plurality of frames is created and stored. The feature vector stored in the frame feature vectors database 208 may further be utilized by the dynamic interval prediction module 210 to determine a vector distance (or dynamic interval) between each of two consecutive frames from the sequence of frames.

The dynamic interval prediction module 210 may be configured to extract the feature vectors corresponding to each of the sequence of frames from the frame feature vectors database 208. Further, the dynamic interval prediction module 210 may determine a vector distance between each of two consecutive frames from the sequence of frames, based on the associated feature vectors. Once the vector distance is determined, the dynamic interval prediction module 210 may be configured to compare the determined vector distance between each of two consecutive frames from the sequence of frames with a first predefined threshold. Based on the comparison, when the vector distance between two consecutive frames is greater than the first predefined threshold, the dynamic interval prediction module 210 may be configured to divide the video content 202 at the time instance in the video content 202 separating the two consecutive frames. This is repeated for every two consecutive frames for which the determined vector distance is greater than the first predefined threshold. As a result, the video content 202 is divided into a plurality of frames based on the sequence of frames. Thus, while the sequence of frames were created by dividing the video content 202 based on a fixed time interval, the plurality of frames are created from the video content 202 by vector distance based division.

The storyline and summarization module 212 may be configured to create the storyline. The storyline may be created based on an object and an action associated with the object in each of the plurality of frames. To create the storyline, the storyline and summarization module 212 may be configured to detect the object and the action associated with the object in each of the plurality of frames. In an embodiment, the object and the action associated with the object may be identified based on a second pre-trained machine learning model. The second pre-trained machine learning model, for example, may correspond to a pre-trained scene description machine learning model. Example of the pre-trained scene description machine learning model may include, but are is not limited to CNN models, Region based CNN (R-CNN) models, linguistic models, or ontology-based models.

Once the storyline is created from each of the plurality of frames, the storyline and summarization module 212 may be configured to summarize the storyline in order to generate the set of instructions. In order to generate the set of instructions, the storyline and summarization module 212 may be configured to capture the current state of the user environment from a real-time video stream, i.e., the video 220. The storyline and summarization module 212 may generate the set of instructions based on a third pre-trained machine learning model. The third pre-trained machine learning model, for example, may be a Long Short-Term Memory (LSTM) model. Once the set of instructions are generated, the storyline and summarization module 212 may be configured to send the set of instructions to the training module 214 that may be configured to train the LSTM model.

The LSTM model may be trained based on the set of instructions generated for future prediction. In order to train the LSTM model, the training module 214 may provide each of the set of instructions as an input (i.e., label) to the LSTM model. Once, the LSTM model is trained, the LSTM model may be used to identify the current state of the user environment. Additionally, the LSTM model may be able to identify an object and an action performed on the object by the user in the current state. Thereafter, based on the current state and the user action performed in the current state, the LSTM model may be configured to predict a next state of the user environment and a next action associated with the user and the object. The training module 214 may the send the next state predicted for the user environment along with the set of instructions to the dynamic instruction rendering module 216.

Based on prediction of the next state and the next action associated with the user and the object, along with the set of instructions received from the training module 214, the dynamic instruction rendering module 216 may be configured to identify one or more instructions from the set of instructions that may rendered as AR content to the user via the AR device 218. With reference to FIG. 1, one or more instructions may be rendered by the content creation device 102. Thus, based on one or more instructions rendered via the AR device 218, the user may perform the repair task or the maintenance task for the device or machine.

Figure 3:
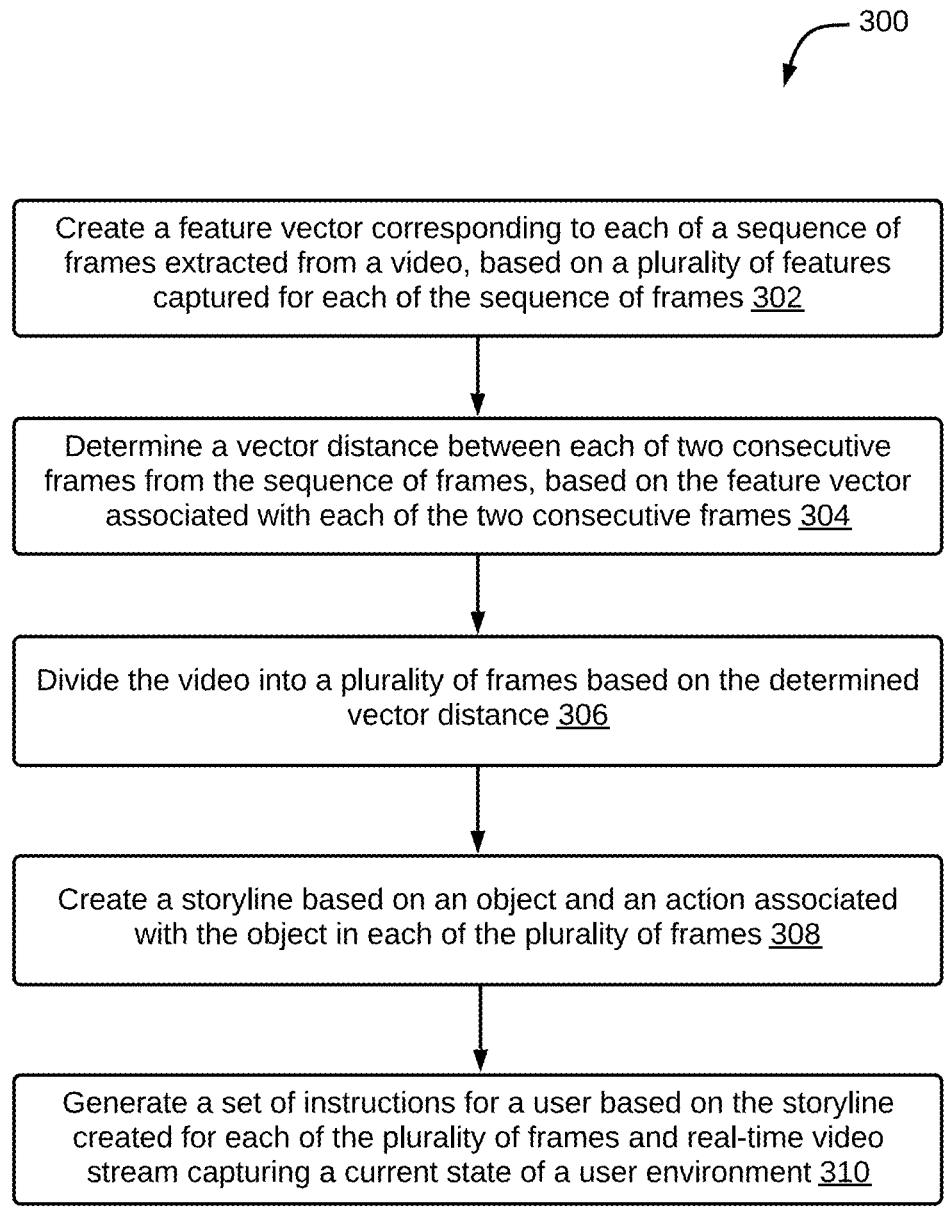
FIG. 3 illustrates a flowchart of a method for Augmented Reality (AR) content creation, in accordance with an embodiment.

Referring now to FIG. 3, a flowchart 300 of a method for AR content creation is illustrated, in accordance with an embodiment. FIG. 3 is explained in conjunction with FIG. 1 and FIG. 2. The control starts at step 302.

At step 302, a feature vector corresponding to each of a sequence of frames may be created. The sequence of frames may be extracted from a video. Moreover, the feature vector may be created based on a plurality of features captured for each of the sequence of frames. In an embodiment, in order to capture the plurality of features, the video (also referred as the video stream) may be divided to create the sequence of frames. In an embodiment, the sequence of frames may correspond to a set of images. Each of the set of images may be represented based on an equation (1) represented below:

$$"I_i=(I_1,I_2,I_3,\ldots,I_n)" \tag{1}$$

where,
"$I_i$" is ordered sequence of each of the set of images for $i=1, 2, \ldots n$ Further, the creation of the feature vector is based on a first pre-trained machine learning model. The first pre-trained machine learning model may correspond to a deep neural network model (e.g., the CNN model). In an embodiment, the feature vector corresponding to each of the sequence of frames may be depicted as represented by equation (2) below:

$$F=\{F_1,F_2,F_3,\ldots,F_n\} \tag{2}$$

where, $i=1, 2, \ldots, n$

In equation (2), $F_1, F_2, F_3, \ldots, F_n$ represents the feature vector corresponding to each of the sequence of frames. In addition, the plurality of features captured corresponding to each of the sequence of frames may be represented based on equation (3), equation (4), and equation (5) represented below:

$$F_1=(F_{11},F_{12},\ldots,F_{1n}) \tag{3}$$

where,
"$F_{1i}$" represents $i^{th}$ feature extracted from a first frame of the sequence of frames.

$$F_2=(F_{21},F_{22},\ldots,F_{2n}) \tag{4}$$

where,
"$F_{2i}$" represents $i^{th}$ feature extracted from a second frame of the sequence of frames.

$$F_n=(F_{n1},F_{n2},\ldots,F_{nn}) \tag{5}$$

where,
"$F_{ij}$" represents $i^{th}$ feature extracted from $j^{th}$ frame i.e., a last frame from the sequence of frames.

In an embodiment, the feature vector created corresponding to each of the sequence of frames may be stored in a database. In reference to FIG. 2, the database may correspond to the frame feature vectors database 208.

Once the feature vectors are created, at step 304, a vector distance may be determined between each of two consecutive frames from the sequence of frames. In an embodiment, the vector distance may be determined based on the feature vector associated with each of the two consecutive frames. In reference to the equation (2), the vector distance between each of the two consecutive frames may be calculated based on an equation (6) represented below:

$$D=d(F_i,F_{i-1}) \tag{6}$$

where,
"D" represents the vector distance between two consecutive frames,
"d" represents a function to calculate the vector distance between the two consecutive frames.

At step 306, the video may be divided into a plurality of frames based on the determined vector distance. Moreover, the video may be divided into the plurality of frames each time when the determined vector distance between two consecutive frames is greater than a first predefined threshold.

At step 308, a storyline may be created. The storyline may be created based on an object and an action associated with the object in each of the plurality of frames. In addition, the action associated with the object is identified based on a second pre-trained machine learning model, which, for example, may be an object detection model or a pre-trained scene description model. To create the storyline, each interval, i.e., each of the plurality of frames, be passed through the second pre-trained machine learning model to identify the object and the action associated with the object in the each of the plurality of frames. In an embodiment, the action associated with the object represents storyline of each of the plurality of frames. Thereafter, the storyline created may be summarized. In order to summarize the storyline, the object and the action associated with the object may be extracted from each of the plurality of frames. In an embodiment, the summarization of the storyline may be done based on Natural Processing Language (NLP).

In an embodiment, the storyline for each of the plurality of frames may be depicted by equation (7) as represented below:

$$S_i=\{S_1,S_2,S_3,\ldots,S_n\} \tag{7}$$

where $i=1, 2, \ldots, n$

In the equation (7), $S_1, S_2, S_3, \ldots, S_n$ represent the storyline generated for each of the plurality of frames. In an embodiment, sentence within the storyline created for each of the plurality of frames may be depicted by equation (8), equation (9), and equation (10) as represented below:

$$S_{1i} = (S_{11}, S_{12}, \ldots, S_{1n}) \quad (8)$$

where, $S_{1i}$ represents $i^{th}$ sentence of the storyline extracted from the $1^{st}$ frame of the plurality of frames.

$$S_{2i} = (S_{21}, S_{22}, \ldots, S_{2n}) \quad (9)$$

where, $S_{2i}$ represents $i^{th}$ sentence of the storyline extracted from the $2^{nd}$ frame of the plurality of frames.

$$S_{ij} = (S_{n1}, S_{n2}, \ldots, S_{nn}) \quad (10)$$

where, $S_{ij}$ represents $i^{th}$ sentence of the storyline extracted from $j^{th}$ frame of the plurality of frames.

In an embodiment, the summarized content created represents the object and the action associated with the object in each of the plurality of frames. In an exemplary embodiment, the summarized content may be created based on a predefined function depicted by equation (11) represented below:

$$\text{Step}_n = f(S_n) \quad (11)$$

where,

"f" represents the predefined function.

At step 310, a set of instructions may be generated for the user based on the storyline created for each of the plurality of frames and a real-time video stream capturing a current state of a user environment. In addition to the captured current state, an object and a user action performed on the object in the current state may also be identified. The set of instructions may be generated by a third pre-trained machine learning model. The third pre-trained machine learning model may correspond to an LSTM model.

Based on the current state of the user environment and the object and the action associated with the object identified in the current environment, the LSTM model may predict or determine a next state of the user environment and a next action associated with the user and the object, based on the current state and the user action performed in the current state. By way of an example, the next action associated with the user and the object depicts a next step to be followed by the user to perform at least one of the repair task or the maintenance task associated with machine. In an embodiment, the next action associated with the object may be dynamically changed based on a state of the user environment where the user may be performing the action on the object. The control passes to the end at 310.

Figure 4:
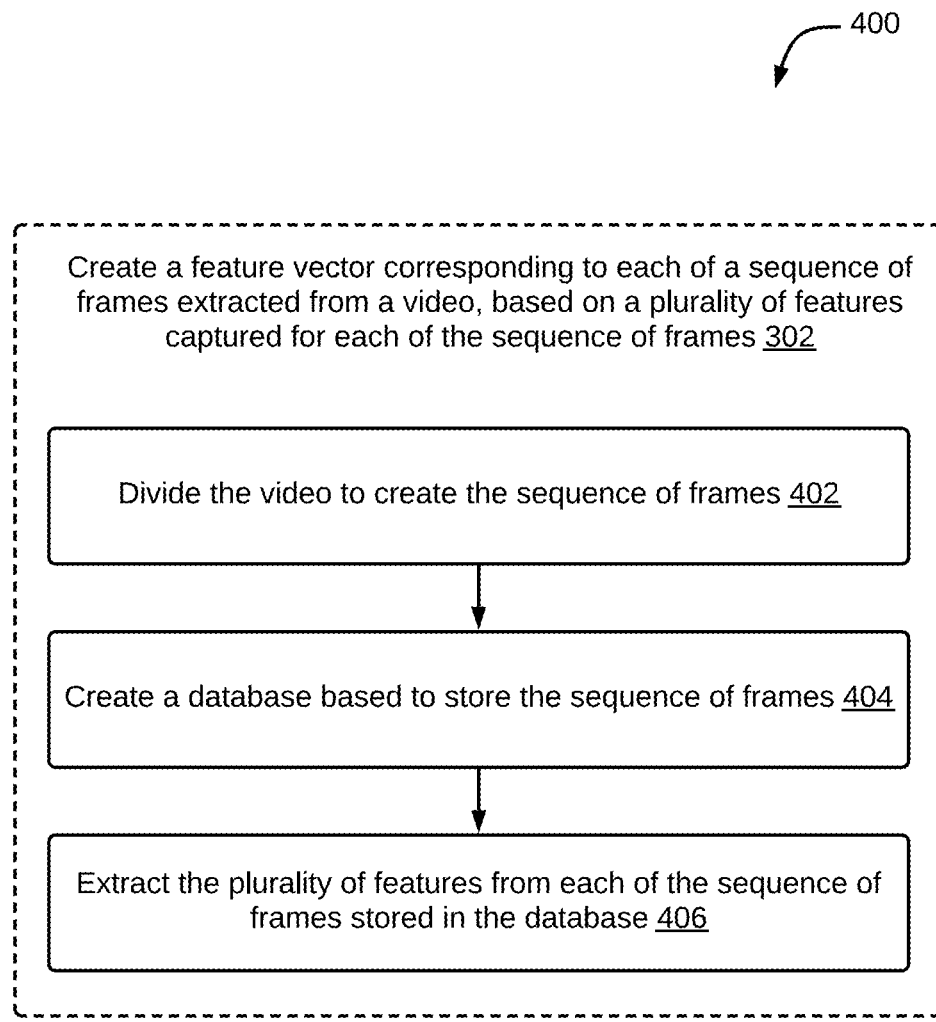
FIG. 4 illustrates a flowchart of method for creating a feature vector corresponding to each of a sequence of frames, in accordance with an embodiment.

FIG. 4 illustrates a flowchart 400 of a method for creating a feature vector corresponding to each of a sequence of frames, in accordance with an embodiment. FIG. 4 is explained in conjunction with FIG. 1 to FIG. 3. The control starts at step 302 and passes to step 402. At step 402, to create the feature vector corresponding to each of the sequence of frames, the video may be divided to create the sequence of frames. By way of an example, the video corresponds to a video stream depicting a repair task or a maintenance task performed by an expert on a device or a machine.

Once the video is divided, at step 404, each of the sequence of frames created, may be stored in a database. In reference to FIG. 2, the database may correspond to the frame database 204. At step 406, a plurality of features may be extracted from each of the sequence of frame. Based on the plurality of features extracted, the feature vector may be created corresponding to each of the sequence of frames extracted from the video. Thereafter, the control passes to step 304 of FIG. 3.

Figure 5:
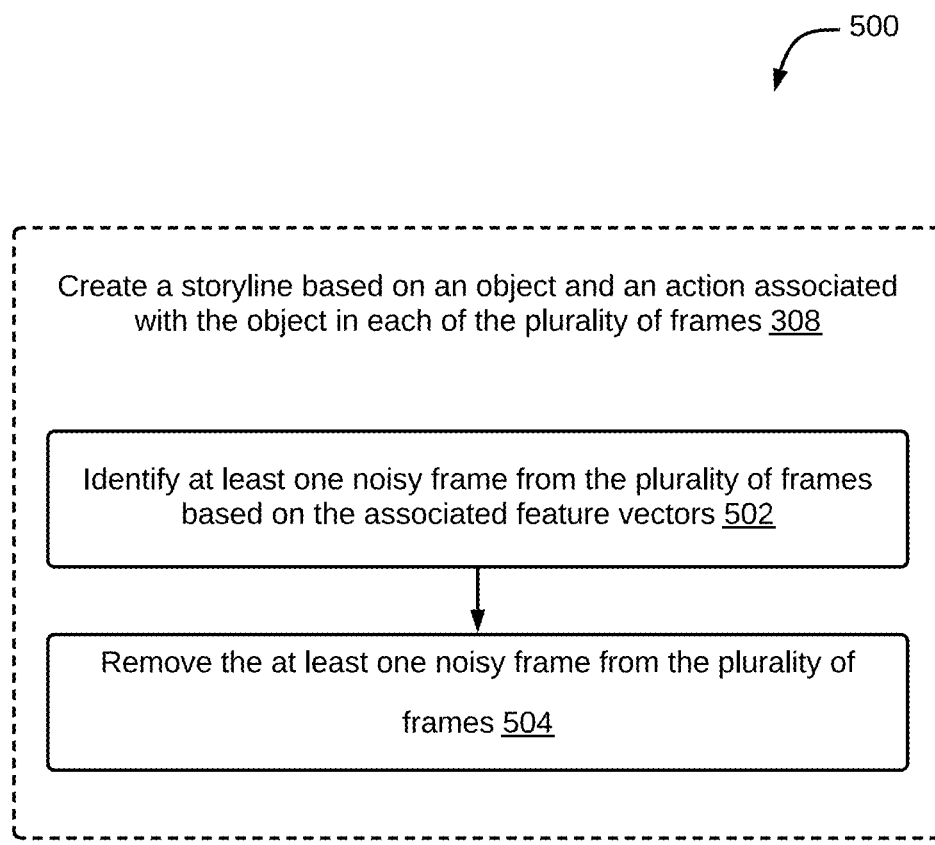
FIG. 5 illustrates a flowchart of a method for creating a storyline corresponding to a plurality of frames by removing at least one noisy frame, in accordance with an embodiment.

FIG. 5 illustrates a flowchart 500 of a method for creating a storyline corresponding to a plurality of frames by removing at least one noisy frame, in accordance with an embodiment. FIG. 5 is explained in conjunction with FIG. 1 to FIG. 4. The control starts at step 308 and passes to step 502.

At step 502, to create the storyline, at least one noisy frame may be determined from the plurality of frames. The at least one noisy frame may be determined based on the feature vector associated with each of the plurality of frames. The method of removing at least one noisy frame from the plurality of frames has been explained in detail in conjunction with FIG. 6. At step 504, the at least one noisy frame may be removed from the sequence of frames. The noisy frame may correspond to a part of a video that may not affect the current state of the user environment and may not be of much relevancy for a user. In an embodiment, the at least one noisy frame corresponds to a frame depicting the same action associated with the object to that of a previous frame. Thus, the at least one noisy frame may be removed to avoid a redundancy of an action performed on the object. In another embodiment, a noisy frame may be a frame that does not include any action. Thereafter, the control passes to step 310.

Figure 6:
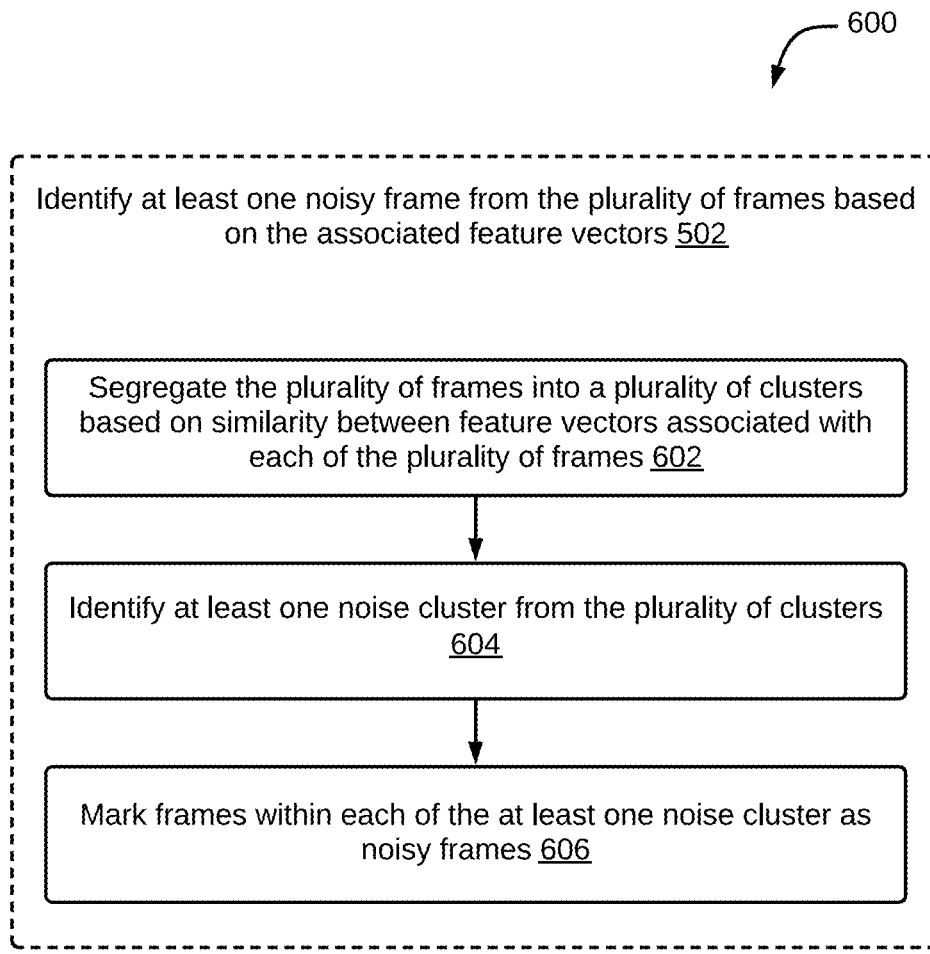
FIG. 6 illustrates a flowchart of a method for identifying at least one noisy frame from a plurality of frames, in accordance with an embodiment.

FIG. 6 illustrates a flowchart 600 of a method for identifying at least one noisy frame from a plurality of frames, in accordance with an embodiment. FIG. 6 is explained in conjunction with FIG. 1 to FIG. 5. The control starts at step 502 and passes to step 602.

In order to identify at least one noisy frame, at step 602, the plurality of frames may be segregated into a plurality of clusters. In an embodiment, the plurality of frames may be segregated based on similarity between feature vectors associated with each of the plurality of frames. The noisy frame may correspond to a part of a video that may not affect the current state of the user environment and may not be of much relevancy for a user.

At step 604, at least one noise cluster from the plurality of clusters may be identified. In an embodiment, at least one noisy cluster may be identified based on distance between feature vectors of frames within each of the at least one noise cluster and feature vector representing a video (from which the plurality of frames were created). The distance between feature vectors of frames within each of the at least one noise cluster and feature vector representing the video is greater than a second predefined threshold. In other words, content within the frames in each of the at least one noise cluster is different from overall theme of the video.

Once the at least one noise cluster is identified, at step 606, frames within each of the at least one noise cluster may be marked as noisy frames. These noisy frames are then removed from the plurality of frames. In this embodiment, a storyline is created based on the remaining plurality of frames obtained after removal of the noisy frames, instead of the plurality of frames. The at least one noisy frame may thus be identified before creating and summarizing the storyline.

By way of an example of the method explained above, a video depicting repair work or maintenance work may include at least one noisy frame (i.e., a noisy data). In an embodiment, the at least one noisy frame may correspond to a part of the video that is useless and does not affect the state of the user environment and need not to be shown to user. For example, the at least one noisy frame may correspond to a frame captured when the camera is transitioning from one scene to the other. Further, the plurality of features may be extracted from each of the plurality of frames. Once the plurality of features are extracted two or more features from the plurality of features may be clustered to identify a first set of similar features. The first set of similar features may represent features that are useful for performing repair work and maintenance work. In addition, two or more features from the plurality of features may be clustered to identify a second set of similar features. The second set of similar features may represent features that are not useful for performing repair work and maintenance work. Therefore, the second set of features may be referred as the noisy data.

Figure 7:
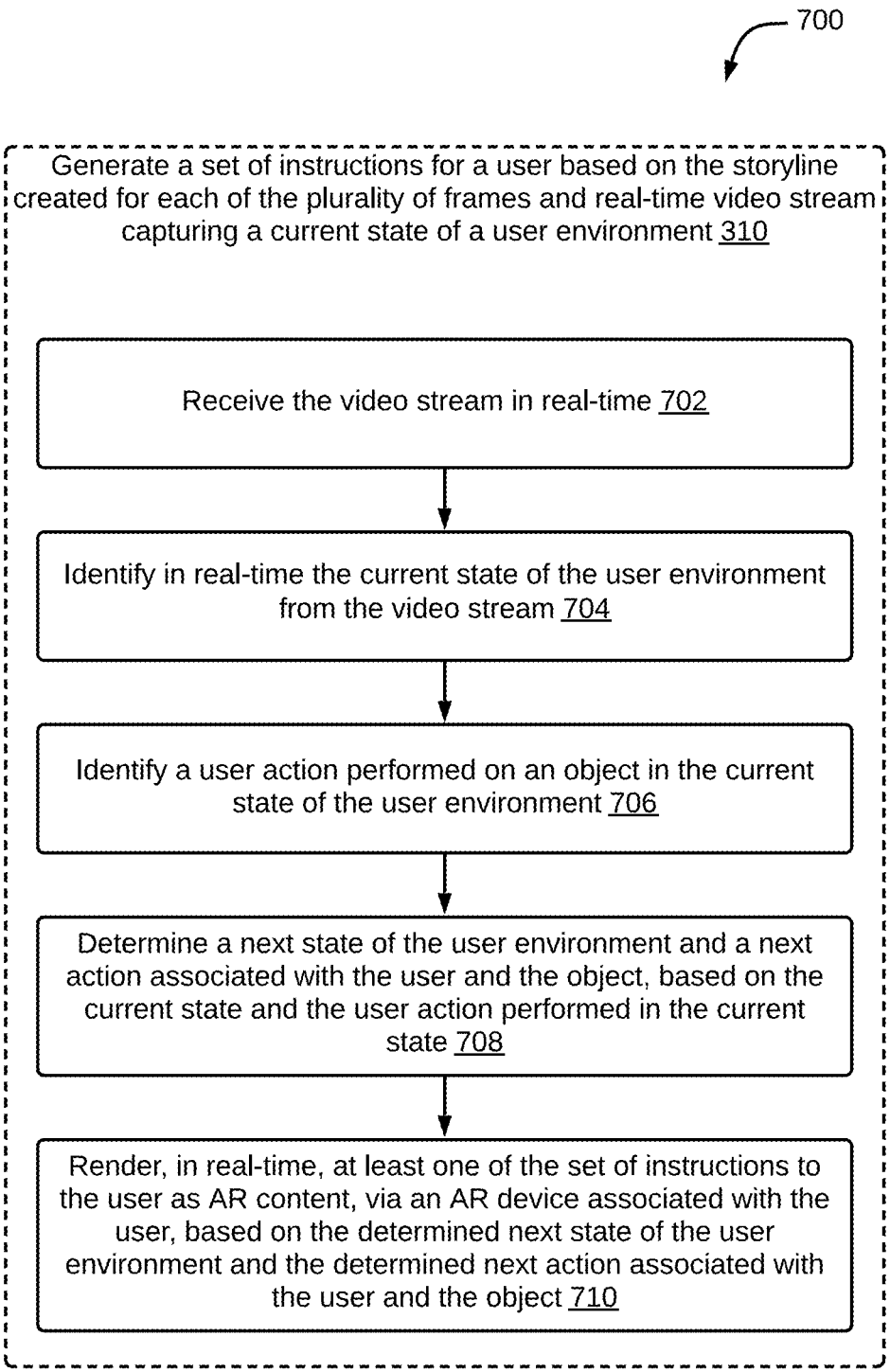
FIG. 7 illustrates a flowchart of a method for generating a set of instructions for a user based on a storyline, in accordance with an embodiment.

FIG. 7 illustrates a flowchart 700 of a method for generating a set of instructions for a user, in accordance with an embodiment. FIG. 7 is explained in conjunction with FIG. 1 to FIG. 6. The control starts at step 310 and passes to step 702.

With reference to FIG. 7, to generate the set of instructions, at step 702, the video stream may be received in real-time. At step 704, as the video stream is received, the current state of user may be identified in real-time from the video stream. Further, at step, 706, an action of the user performed on the object may be identified in the current state of the user environment.

Upon determining the current state and the user action performed in the current state, at step 708, a next state of the user environment may be determined (or predicted). Additionally, based on the current state and the user action performed in the current state, a next action associated with the user and the object may be determined in the next state of the user environment.

Thereafter, based on the determined next state of the user environment and the determined next action associated with the user and the object, at step 710, at least one of the set of instructions generated may be rendered to the user as AR content in real-time. It should be noted that, the AR content may be rendered via an AR device. The control passes to the end at step 710.

In an exemplary embodiment, a real-time video stream of the user's action may be taken and sent to a trained LSTM model. The real-time video stream received may be divided based on the fixed time interval into a sequence of frames. The sequence of frames divided may be depicted as represented by equation (11) below:

$$IR_i = (IR_1, IR_2, IR_3, \ldots, IR_n) \quad (11)$$

where, i=1,2,3, . . . , n.

In equation (11), $IR_i$ represents ordered sequence of real time images (also referred as the sequence of frames). The user action as identified in the current state of the user environment may be sent to the trained LSTM model as input. Further, based on an object and the user action on the object identified in the current state, the LSTM model may render one or more instructions aligned or associated with the action to the user as AR content. The LSTM model may also determine (or predict) the next state of the user environment and a next action associated with the user and the object. The LSTM model may accordingly generate one or more next instructions to be rendered to the user as AR content. Instructions generated may be rendered to the user via an AR device (for example, the AR device 218). It should be noted that, prediction of state of the user environment and the action associated may continue using the trained LSTM model until a final state of the user environment is reached. It may be apparent to a person skilled in the art that training of the LSTM model may also follow the same process as discussed above.

Figure 8A:
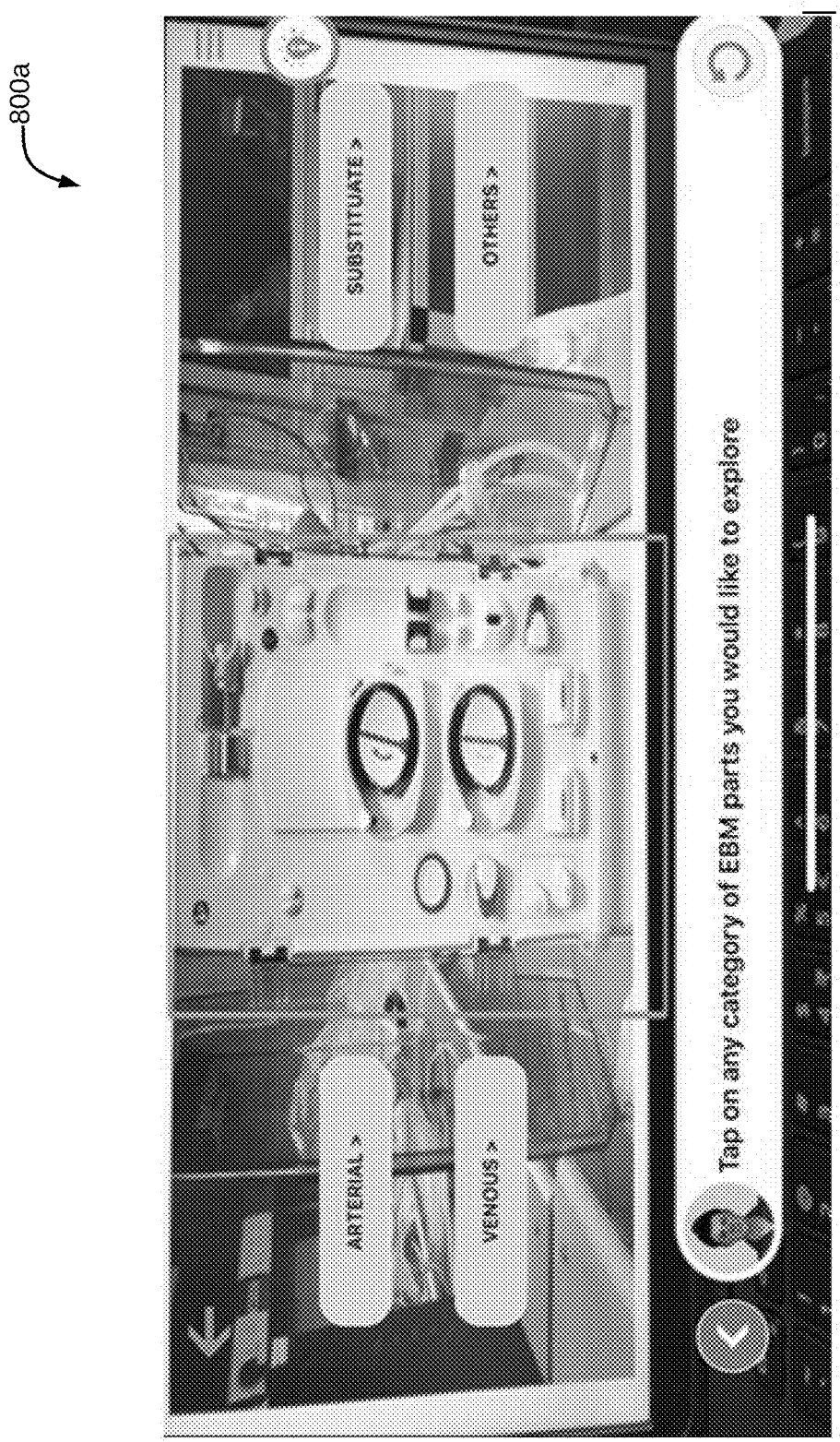
FIGS. 8A-8B illustrate a pictorial representation of rendering at least one of a set of instructions generated based on a current state of a user environment, in accordance with an exemplary embodiment.
Figure 8B:
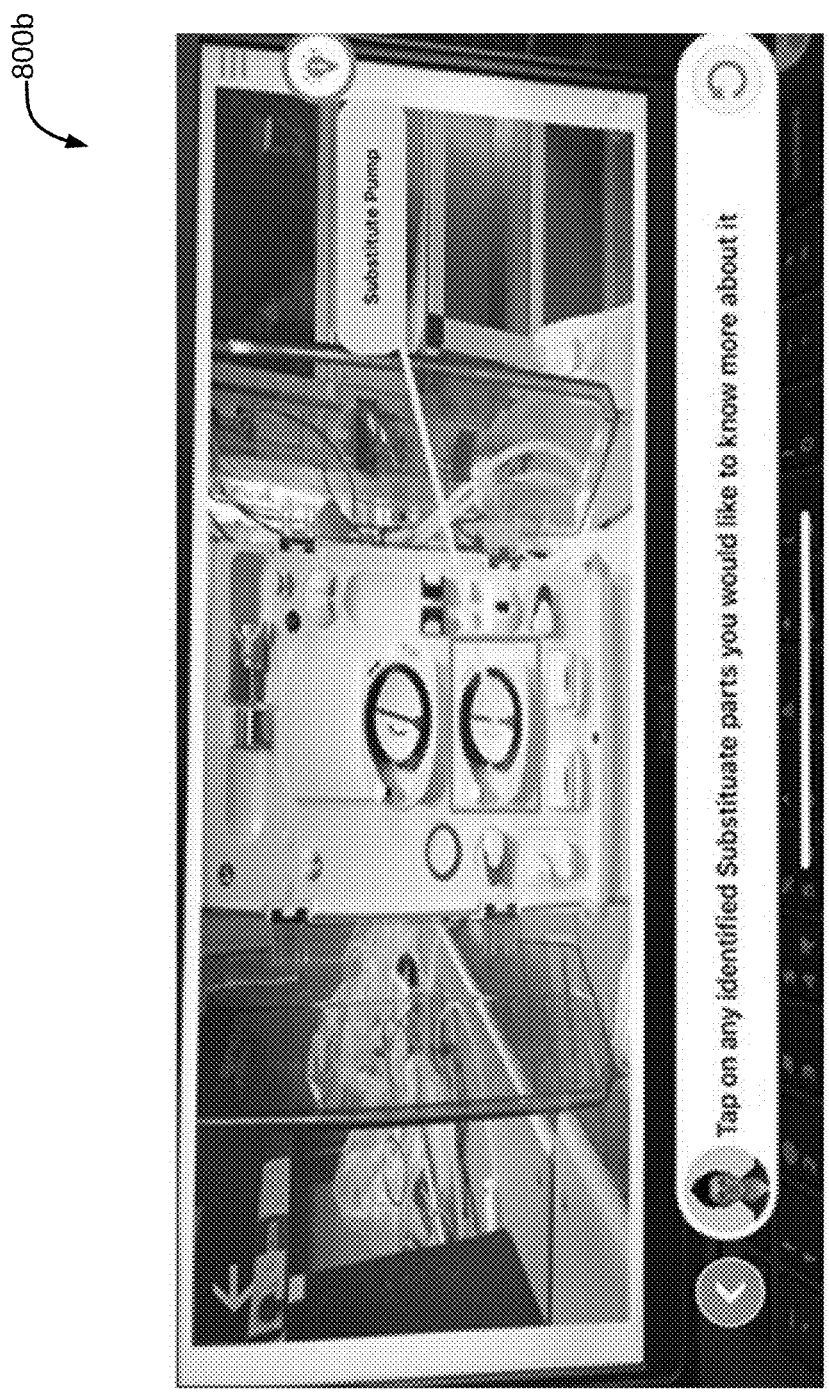

FIGS. 8A-8B illustrate pictorial representations 800a and 800b of rendering at least one of a set of instructions generated based on a current state determined for a user environment, in accordance with an exemplary embodiment. FIGS. 8A-8B are explained in conjunction with FIG. 1 to FIG. 7.

In FIG. 8A, at least one of the set of instructions may be rendered to a user as AR content, via an AR device (for example, the AR device 218) associated with the user, based on the current state of the user environment. In reference to FIG. 1, at least one of the set of instructions may be rendered by the content creation device 102. By way of an example, as depicted in FIG. 8A, an instruction "Tap on any category of Evidence Based Machine (EBM) parts you would like to explore" may be rendered based on a set of objects identified of the EBM parts. The set of objects identified may include "ARTERIAL", "VENOUS", "SUBSTITUTE", and "OTHERS". Moreover, the instruction "Tap on any category of EBM parts you would like to explore" may be rendered to the user via the AR device.

Once the user taps on the object "SUBSTITUTE" from the set of objects, a next state of the user environment and a next action associated with the user and the object may be determined (or predicted, in other words). The next state and the next action associated with the user and the object may be determined based on the current state and the user action performed in the current state. In current example, the user action performed may correspond to a selection of the object "SUBSTITUTE". Thereafter, once the next state and the next action associated with the user and the object is determined at least an instruction from the set of instructions may be rendered to the user.

By way of an example, as depicted in FIG. 8B, an instruction "Tap on any substitute parts you would like to know more about it" may be rendered to the user on identifying an object as "a substitute pump".

Figure 9:
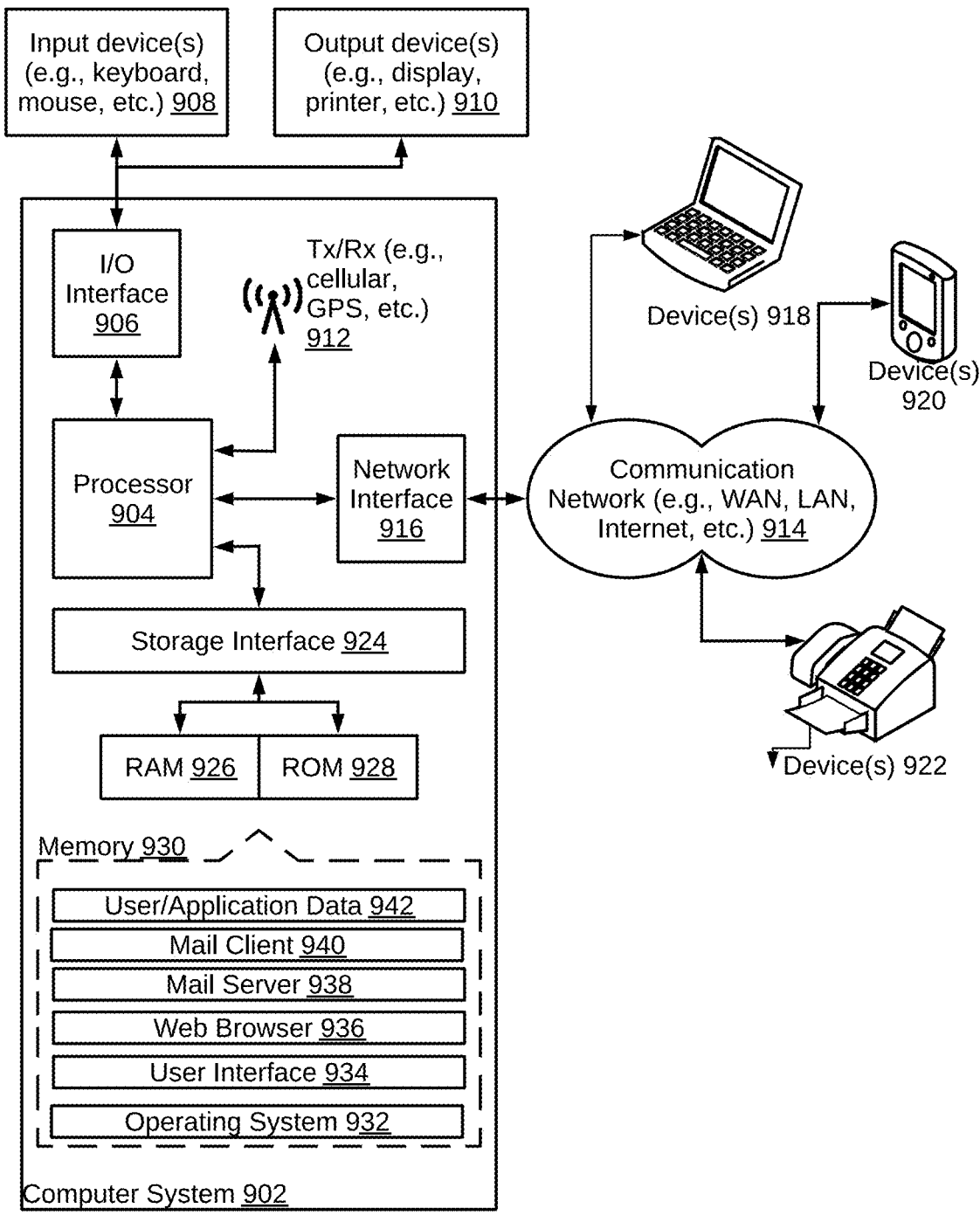
FIG. 9 illustrates a block diagram of an exemplary computer system for implementing embodiments consistent with the present disclosure.

Referring now to FIG. 9, a block diagram 900 of an exemplary computer system 902 for implementing various embodiments is illustrated. Computer system 902 may include a central processing unit ("CPU" or "processor") 904. Processor 904 may include at least one data processor for executing program components for executing user or system-generated requests. A user may include a person, a person using a device, such as those included in this disclosure, or such a device itself. Processor 904 may include specialized processing units such as integrated system (bus) controllers, memory management control units, floating point units, graphics processing units, digital signal processing units, etc. Processor 904 may include a microprocessor, such as AMD® ATHLOM® microprocessor, DURON® microprocessor OR OPTERON® microprocessor ARM's application, embedded or secure processors, IBM® POWERPC®, INTEL'S CORE® processor, ITANIUM® processor, XEON® processor, CELERON® processor or other line of processors. Processor 904 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 904 may be disposed in communication with one or more input/output (I/O) devices via an I/O interface 906. The I/O interface 906 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 906, computer system 902 may communicate with one or more I/O devices. For example, an input device 908 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 910 may be a printer, fax machine, video display (for example, cathode ray tube (CRT), liquid crystal display (LCD), light-emitting diode (LED), plasma, or the like), audio speaker, etc. In some embodiments, a transceiver 912 may be disposed in connection with processor 904. Transceiver 912 may facilitate various types of wireless transmission or reception. For example, transceiver 912 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 904 may be disposed in communication with a communication network 914 via a network interface 916. Network interface 916 may communicate with communication network 914. Network interface 916 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 914 may include, without limitation, a direct interconnection, local area network (LAN), wide area network (WAN), wireless network (for example, using Wireless Application Protocol), the Internet, etc. Using network interface 916 and communication network 914, computer system 902 may communicate with devices 918, 920, and 922. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 902 may itself embody one or more of these devices.

In some embodiments, processor 904 may be disposed in communication with one or more memory devices (for example, RAM 926, ROM 928, etc.) via a storage interface 924. Storage interface 924 may connect to memory 930 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 930 may store a collection of program or database components, including, without limitation, an operating system 932, user interface application 934, web browser 936, mail server 938, mail client 940, user/application data 942 (for example, any data variables or data records discussed in this disclosure), etc. Operating system 932 may facilitate resource management and operation of computer system 902. Examples of operating systems 932 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 934 may facilitate display, execution, interaction, manipulation, or operation of program components through textual or graphical facilities. For example, user interfaces may provide computer interaction interface elements on a display system operatively connected to computer system 902, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 902 may implement a web browser 936 stored program component. Web browser 936 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 902 may implement a mail server 938 stored program component. Mail server 938 may be an Internet mail server such as MICROSOFT® EXCHANGE® mail server, or the like. Mail server 938 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 938 may utilize communication protocols such as internet message access protocol (IMAP), messaging application programming interface (MAPI), Microsoft Exchange, post office protocol (POP), simple mail transfer protocol (SMTP), or the like. In some embodiments, computer system 902 may implement a mail client 940 stored program component. Mail client 940 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 902 may store user/application data 942, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the disclosure provide a method and a system for AR content creation. The method and the system may first create a feature vector corresponding to each of a sequence of frames extracted from a video, based on a plurality of features captured for each of the sequence of frames. The sequence of frames may be obtained by diving a video. The method and system may then determine a vector distance between each of two consecutive frames from the sequence of frames, based on the feature vector associated with each of the two consecutive frames. Further, the method may divide the video into a plurality of frames based on the determined vector distance. The video may be divided into the plurality of frames each time when the determined vector distance between two consecutive frames is greater than a first predefined threshold value. Thereafter, the method and the system may create a storyline based on an object and an action associated with the object in each of the plurality of frames. Additionally, the method and the system may generate a set of instructions for a user based on the storyline created for each of the plurality of frames and real-time video stream capturing a current state of a user environment.

The present disclosure facilitates automatic generation of content (such as. AR content) from video data. In accordance with an embodiment, such content may be used for repair of machines and/or maintenance work of machines. The disclosed method and the system may provide steps and actions associated with the steps from a given machine repair video data provided by expert, in automated way. This in turn may help to overcome a lot of manual intervention required for repair or maintenance work of the machine. In order to provide steps and action associated with the steps, the disclosed method and the system may use unsupervised approach to extract the plurality of features from each of the sequence of frames. In addition, the disclosed method and the system may use pre-trained scene description models to detect the object and the action associated with the object. Thereafter, based on the content generated, the disclosed system may train a supervised LSTM to derive state of the user environment and actions associated with each state required for user to repair multiple machines. Moreover, the disclosed method and the system may handle steps that can be skipped, by skipping corresponding action and predict next state based on a user action.

The specification has described the method and the system for the AR content creation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for Augmented Reality (AR) content creation, the method comprising:
   creating, by a content creation device, a feature vector corresponding to each of a sequence of frames extracted from a video, based on a plurality of features captured for each of the sequence of frames, wherein the creation of the feature vector is based on a first pre-trained machine learning model;
   determining, by the content creation device, a vector distance between each of two consecutive frames from the sequence of frames, based on the feature vector associated with each of the two consecutive frames;
   dividing, by the content creation device, the video into a plurality of frames based on the determined vector distance, wherein the video is divided each time the determined vector distance between two consecutive frames is greater than a first predefined threshold value;
   creating, by the content creation device, a storyline based on an object and an action associated with the object in each of the plurality of frames, wherein the object and the action associated with the object is identified based on a second pre-trained machine learning model; and generating, by the content creation device, a set of instructions for a user based on the storyline created for each of the plurality of frames and real-time video stream capturing a current state of a user environment, wherein the set of instructions is generated by a third pre-trained machine learning model.

2. The method of claim 1, further comprising:
dividing the video based on a fixed time interval to create the sequence of frames; and
creating a database to store the sequence of frames.

3. The method of claim 2, further comprising extracting the plurality of features from each of the sequence of frames stored in the database.

4. The method of claim 1, wherein generating the set of instructions comprises:
receiving the video stream in real-time; and
identifying in real-time, by the third pre-trained machine learning model, the current state of the user environment from the video stream.

5. The method of claim 4, further comprising:
identifying, by the third pre-trained machine learning model, a user action performed on an object in the current state of the user environment; and
determining, by the third pre-trained machine learning model, a next state of the user environment and a next action associated with the user and the object, based on the current state and the user action performed in the current state.

6. The method of claim 5, further comprising rendering, in real-time, at least one of the set of instructions to the user as AR content, via an AR device associated with the user, based on the determined next state of the user environment and the determined next action associated with the user and the object.

7. The method of claim 1, wherein creating the storyline further comprises:
identifying at least one noisy frame from the plurality of frames based on the associated feature vectors; and
removing the at least one noisy frame from the plurality of frames, wherein the storyline is created for the remaining plurality of frames.

8. The method of claim 7, wherein identifying the at least one noisy frame comprises:
segregating the plurality of frames into a plurality of clusters based on similarity between feature vectors associated with each of the plurality of frames;
identifying at least one noise cluster from the plurality of clusters, wherein distance between feature vectors of frames within each of the at least one noise cluster and feature vector representing the video is greater than a second predefined threshold value; and
marking frames within each of the at least one noise cluster as noisy frames.

9. A system for Augmented Reality (AR) content creation, the system comprising:
a processor; and
a memory communicatively coupled to the processor, wherein the memory stores processor instructions, which, on execution, causes the processor to:
create a feature vector corresponding to each of a sequence of frames extracted from a video, based on a plurality of features captured for each of the sequence of frames, wherein the creation of the feature vector is based on a first pre-trained machine learning model;
determine a vector distance between each of two consecutive frames from the sequence of frames, based on the feature vector associated with each of the two consecutive frames;
divide the video into a plurality of frames based on the determined vector distance, wherein the video is divided each time the determined vector distance between two consecutive frames is greater than a first predefined threshold value;
create a storyline based on an object and an action associated with the object in each of the plurality of frames, wherein the object and the action associated with the object is identified based on a second pre-trained machine learning model; and
generate a set of instructions for a user based on the storyline created for each of the plurality of frames and real-time video stream capturing a current state of a user environment, wherein the set of instructions is generated by a third pre-trained machine learning model.

10. The system of claim 9, wherein the processor instructions further cause the processor to:
divide the video based on a fixed time interval to create the sequence of frames; and
create a database to store the sequence of frames.

11. The system of claim 10, wherein the processor instructions further cause the processor to extract the plurality of features from each of the sequence of frames stored in the database.

12. The system of claim 9, wherein the processor instructions further cause the processor to generate the set of instructions by:
receiving the video stream in real-time; and
identifying in real-time the current state of the user environment from the video stream.

13. The system of claim 12, wherein the processor instructions further cause the processor to:
identify a user action performed on an object in the current state of the user environment; and
determine a next state of the user environment and a next action associated with the user and the object, based on the current state and the user action performed in the current state.

14. The system of claim 13, wherein the processor instructions further cause the processor to render, in real-time, at least one of the set of instructions to the user as AR content, via an AR device associated with the user, based on the determined next state of the user environment and the determined next action associated with the user and the object.

15. The system of claim 9, wherein the processor instructions further cause the processor to create the storyline by:
identifying at least one noisy frame from the plurality of frames based on the associated feature vectors; and
removing the at least one noisy frame from the plurality of frames, wherein the storyline is created for the remaining plurality of frames.

16. The system of claim 15, wherein the processor instructions further cause the processor to identify the at least one noisy frame by:
segregating the plurality of frames into a plurality of clusters based on similarity between feature vectors associated with each of the plurality of frames;
identifying at least one noise cluster from the plurality of clusters, wherein distance between feature vectors of frames within each of the at least one noise cluster and feature vector representing the video is greater than a second predefined threshold value; and marking frames within each of the at least one noise cluster as noisy frames.

17. A non-transitory computer-readable storage medium for Augmented Reality (AR) content creation, having stored thereon, a set of computer-executable instructions causing a computer comprising one or more processors to perform steps comprising:

create a feature vector corresponding to each of a sequence of frames extracted from a video, based on a plurality of features captured for each of the sequence of frames, wherein the creation of the feature vector is based on a first pre-trained machine learning model;

determine a vector distance between each of two consecutive frames from the sequence of frames, based on the feature vector associated with each of the two consecutive frames;

divide the video into a plurality of frames based on the determined vector distance, wherein the video is divided each time the determined vector distance between two consecutive frames is greater than a first predefined threshold value;

create a storyline based on an object and an action associated with the object in each of the plurality of frames, wherein the object and the action associated with the object is identified based on a second pre-trained machine learning model; and generate a set of instructions for a user based on the storyline created for each of the plurality of frames and real-time video stream capturing a current state of a user environment, wherein the set of instructions is generated by a third pre-trained machine learning model.

* * * * *